(No Model.)

H. SANTROCK.
Grain Drill.

No. 233,439. Patented Oct. 19, 1880.

Witnesses:
Nat. E. Oliphant
Richard F. Wagner

Inventor:
Henry Santrock,
per Chas. H. Fowler,
Attorney.

UNITED STATES PATENT OFFICE.

HENRY SANTROCK, OF HARVEY TOWNSHIP, SMITH COUNTY, KANSAS.

GRAIN-DRILL.

SPECIFICATION forming part of Letters Patent No. 233,439, dated October 19, 1880.

Application filed August 12, 1880. (No model.)

*To all whom it may concern:*

Be it known that I, HENRY SANTROCK, a citizen of the United States, residing at Harvey township, in the county of Smith and State of Kansas, have invented certain new and useful Improvements in Grain-Drills; and I do hereby declare that the following is a full, clear, and exact description of the same, reference being had to the annexed drawings, making a part of this specification, and to the letters and figures of reference marked thereon.

Figure 1:
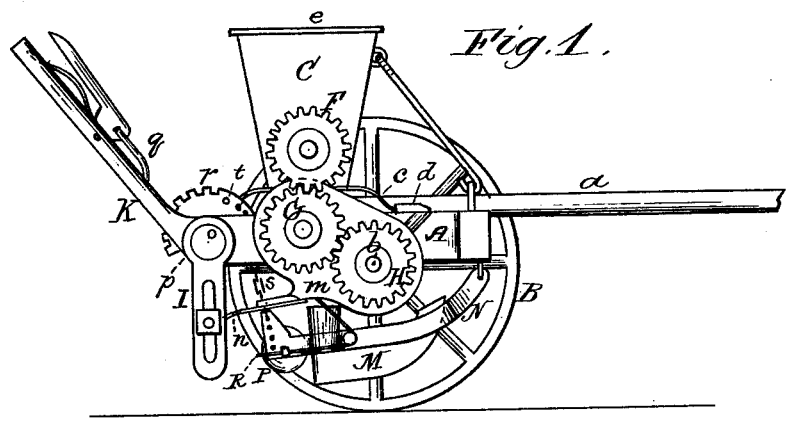
Figure 2:
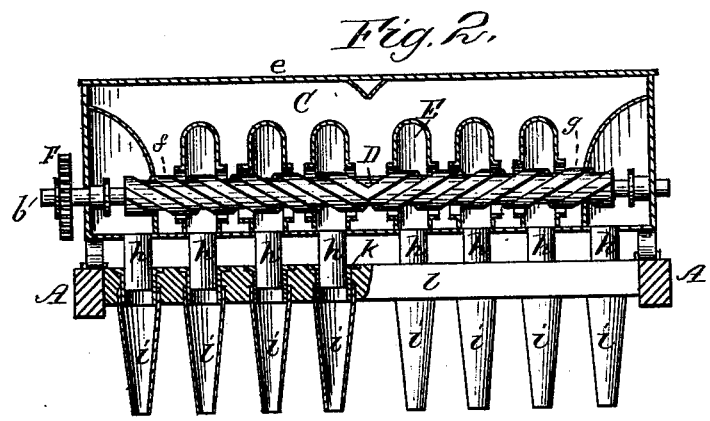
Figure 3:
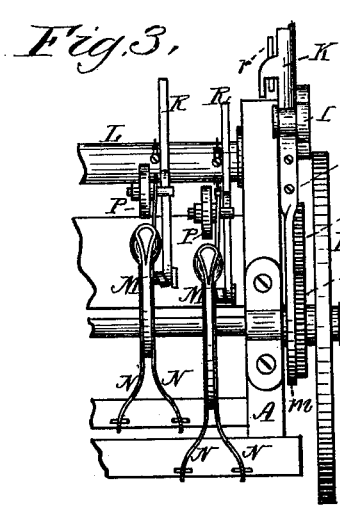
Figure 4:
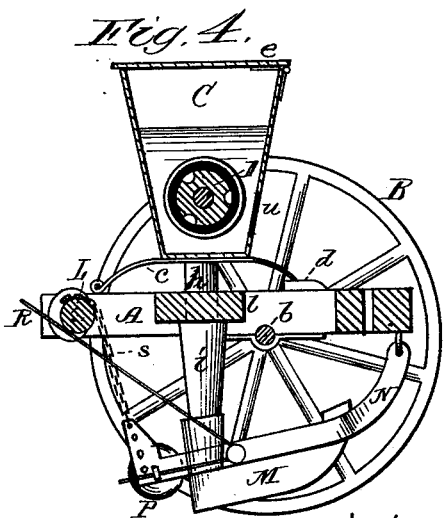

Figure 1 of the drawings is an end view of the grain-drill with one of the wheels removed. Fig. 2 is a sectional view of the hopper and arches with the screw-feeder in elevation; Fig. 3, an under-plan view, in detail, of the grain-drill; and Fig. 4 is an end view, partly in section.

This invention has relation to certain new and useful improvements in grain-drills; and it consists in the several details of construction, as illustrated in the drawings, and which will be hereinafter described.

In the accompanying drawings, A represents a suitable frame, having connected thereto a suitable tongue, $a$, and axle $b$, to which are secured the wheels B.

A seed-hopper, C, is supported by springs $c$ over said frame A, one end of the spring being hinged to the frame, while the opposite end rests in a seat, $d$. The springs $c$ are rigidly secured to the under side of the hopper C, at each end thereof, which gives a yielding action to the hopper when passing over hard and rough soil, while the hinging of one end of the springs admits of the hopper being swung down parallel, or nearly so, with the frame A. This seed-hopper C is provided with a suitable cover, $e$, and has located within the same a rotary feeder, D, the ends thereof having its bearings in the ends of the hopper. This feeder D consists of a long cylinder extending the entire length of the hopper having upon its periphery threads $f g$, in the form of a common screw, said threads being arranged so that at each point where the grain is discharged from the hopper C there will be four or other suitable number of threads, thereby causing a constant and steady discharge of the grain.

The threads $f g$ are right and left, or run in different directions—that is to say, the threads $f$ on the left run to the left, while the threads $g$ upon the right run to the right, forming a division midway of the ends of the feeder D.

Immediately over each one of the grain-discharge tubes $h$ and the threads of the feeder is an arch, E, which prevents the grain from reaching the hose $i$, except that which is intended to be discharged by the action of the threads upon the feeder D. The flexible hose $i$ is secured around the lower end of metal sleeves $k$, passing through a cross-piece, $l$, of the frame A.

One end of the axle of the feeder D passes through the end of the hopper C some distance, and has detachably connected to it a cog-wheel, F, which gears with the teeth upon a similar wheel, G, journaled to a plate, $m$, which, in turn, meshes with the teeth upon a third wheel, H, rigidly secured to the axle $b$, so that as the driving-wheels B revolve motion is communicated to the feeder D by the three gear-wheels above mentioned, the number of cogs on the wheels governing the number of revolutions of the feeder and the amount of grain discharged.

The wheel F on the feeder may be easily removed and another substituted, according to the amount of grain required to be discharged.

The plate $m$ is formed with an arm, $n$, and to this arm is connected a slotted plate, I, formed with sleeve $p$, which passes around the end of an eccentric-lever, K, carrying a spring-pawl, $q$, which engages with a rack-bar or ratchet, $r$.

The lever K is employed for the purpose of throwing the wheel G out of gear with the wheel F, when so desired, the extent to which the lever is required to be moved being governed by the point of connection of the arm $n$ with the slotted plate I, the arm being capable of adjustment within the slot, and held therein by a jam-nut or other convenient means. This lever K is connected to the roller L in such manner as to admit of said roller being raised or lowered by the action of the lever.

Shoes M are connected to the roller L by suitable cords or chains, $s$, their forward ends having forked arms N, which are hinged to the frame A, so as to allow the shoes to work up or down, according to the lay of the ground.

It will be noticed that one shoe is placed a little in advance of the other or one beside it, thus allowing one shoe to pass clods of earth before the following one reaches it.

If desired, the shoes may be made adjustable by setting them either high or low with relation to the forked arms N, the latter acting as braces to the shoes.

To the rear ends of the shoes are gage-wheels P, having a concave or grooved face to prevent the clods from falling to the center of the track. The pins on which these wheels revolve are made larger next to the end of the brace-arms N, which, on account of oiling, prevents less friction.

The springs R, connected to the shoes, keep them constantly in the earth, the rear end of the springs bearing on the roller L.

The lever K not only throws the wheels F G in or out of gear, but, as previously stated, regulates the depth to which the shoes go in the ground or soil in which the grain is planted.

Now, the distance with which the lever is pushed forward is governed by a pin, $t$, inserted in the side of the ratchet-plate $r$, said pin being removable and adapted to be inserted in any one of a series of holes in said ratchet-plate.

When it is desired to clean out the hopper C, in case a change of seed is required, or to remove the hose, the hopper can be swung or tilted backward.

Openings $u$ in the side of the hopper allow the operator to note the exact amount of grain discharged.

Having now fully described my invention, what I claim as new, and desire to secure by Letters Patent, is—

1. The hopper C, having arches E, and feeder D, with screw-threads $f$ $g$, said hopper being suspended by the springs $c$, hinged at one end to the frame A, in combination with the shoes M, hose $i$, sleeves $k$, and tubes $h$, substantially as and for the purpose specified.

2. The shoes M, having brace-arms N, springs R, chains $s$, and roller L, in combination with the lever K, ratchet-plate $r$, and pin $t$, substantially as and for the purpose set forth.

In testimony that I claim the above I have hereunto subscribed my name in the presence of two witnesses.

HENRY SANTROCK.

Witnesses:
WM. C. DON CARLOS,
CHAS. A. SHATTUCK.